C. CHRISTIANSON.
PLOW ATTACHMENT.
APPLICATION FILED AUG. 10, 1908.
930,266.
Patented Aug. 3, 1909.
2 SHEETS—SHEET 1.
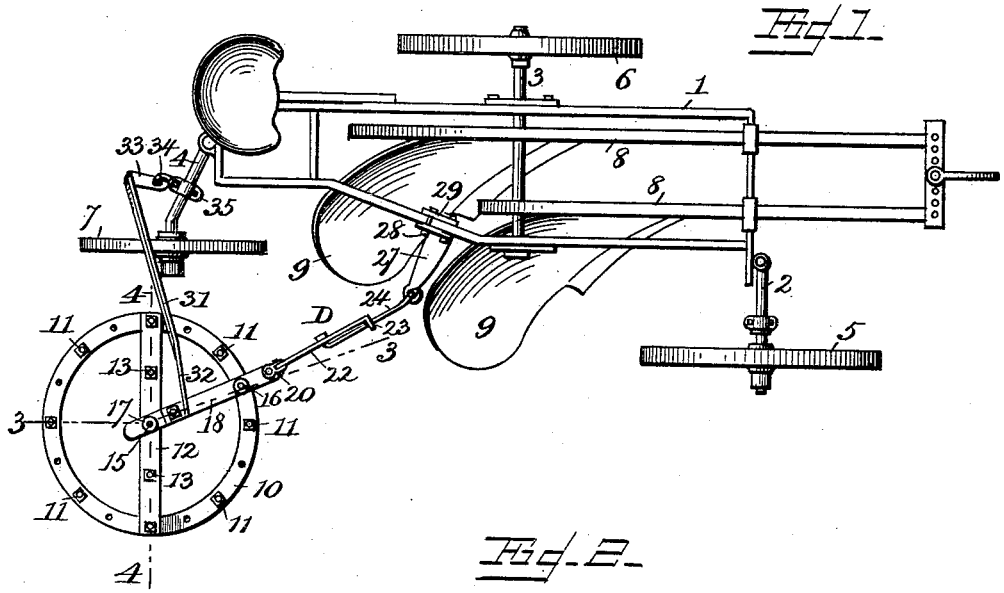
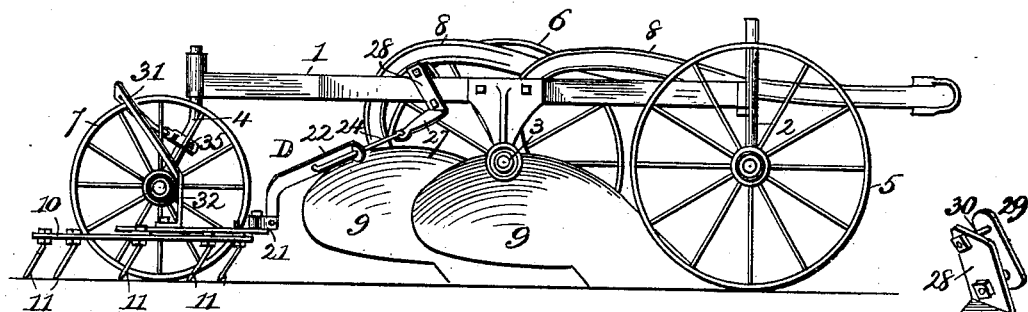
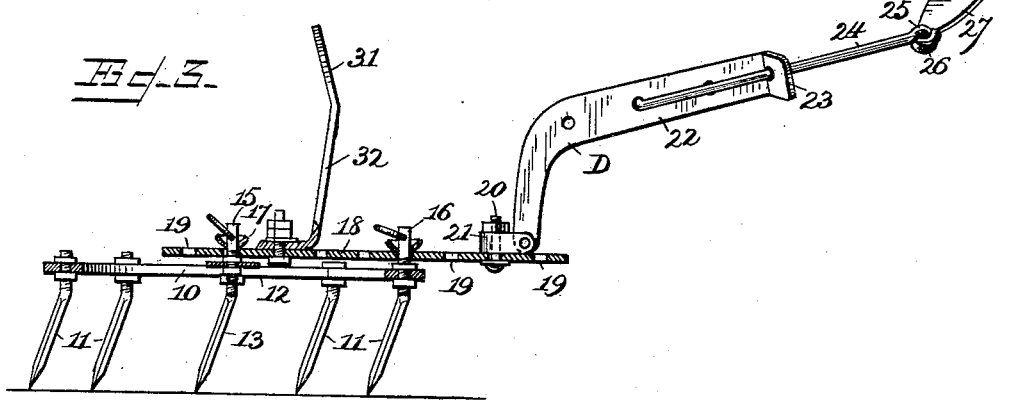
Witnesses
F. L. Ourand
C. H. Grieshauer
Inventor
Christian Christianson
By H. B. Willson & Co
Attorneys C. CHRISTIANSON.
PLOW ATTACHMENT.
APPLICATION FILED AUG. 10, 1908.
930,266.
Patented Aug. 3, 1909.
2 SHEETS—SHEET 2.
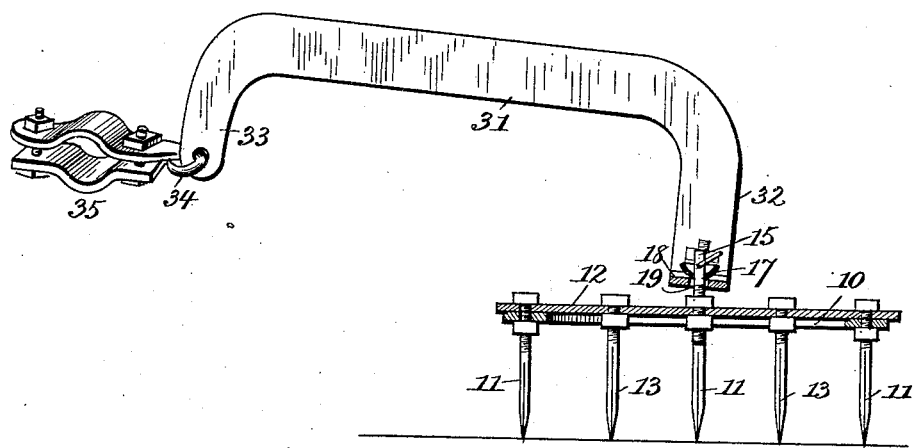
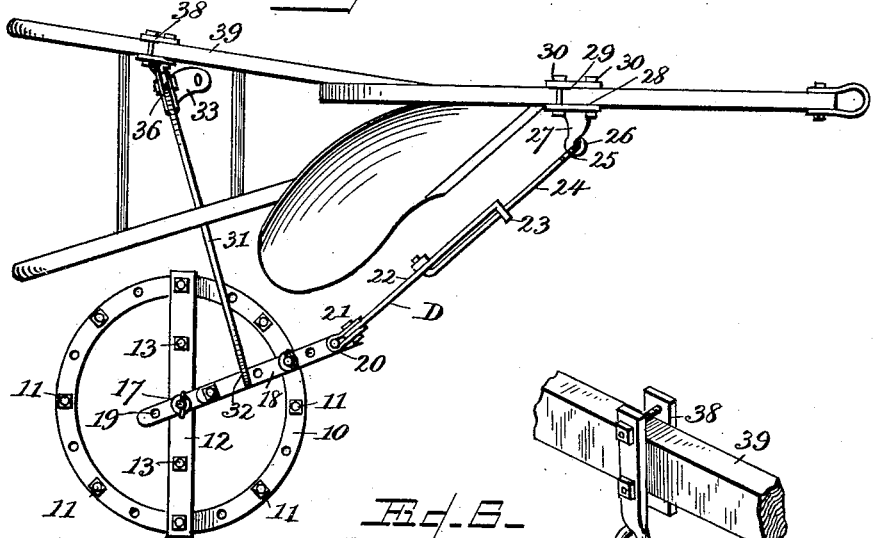
Witnesses
F. L. Ourand
C. H. Griesbauer
Inventor
Christian Christianson
By H. B. Willson & Co.
Attorneys

UNITED STATES PATENT OFFICE.

CHRISTIAN CHRISTIANSON, OF BOWBELLS, NORTH DAKOTA.

PLOW ATTACHMENT.

No. 930,266.

Specification of Letters Patent.   Patented Aug. 3, 1909.

Application filed August 10, 1908.   Serial No. 447,804.

*To all whom it may concern:*

Be it known that I, CHRISTIAN CHRISTIANSON, a citizen of the United States, residing at Bowbells, in the county of Ward and State of North Dakota, have invented certain new and useful Improvements in Plow Attachments; and I do declare the following to be a full, clear, and exact description of the invention, such as will enable others skilled in the art to which it appertains to make and use the same.

My invention relates to harrow attachments for plows, and particularly for sulky or wheel plows.

The object of the invention is the provision of a device of this character which may be readily and conveniently attached to the plow frame whereby as the furrow is turned it is continuously harrowed so as to avoid a second or separate operation of harrowing the ground.

With these and other objects in view, the invention consists of certain novel features of construction, combination and arrangement of parts, as will be more fully described and particularly pointed out in the appended claim.

In the accompanying drawings, Figure 1 is a plan view of the device shown attached to a sulky gang plow, Fig. 2 is a side elevation of the same, Fig. 3 is a longitudinal section on the line 3—3 of Fig. 1, Fig. 4 is a transverse section on the line 4—4 of Fig. 1, Fig. 5 is a plan view of the device shown attached to a walking plow, Fig. 6 is a fragmentary perspective view showing the connection of the spacing beam with the handle brace.

In the drawings I have shown an ordinary form of sulky plow with the frame 1 mounted upon the axles 2, 3 and 4, upon which the ordinary wheels 5, 6 and 7, are journaled for supporting the device. The beam 8 is connected to the frame in any suitable manner and is supplied with the usual turn shares 9, which are attached to gang plows.

All of the above is simply a description of the parts of a gang plow which are associated in the attachment of the harrow which I shall now describe.

The harrow attachment preferably comprises a circular frame 10, from which depend therefrom the rearwardly extending harrow teeth 11. This frame is bridged by a cross piece 12, which is also provided with similar harrow teeth 13. The center part of the frame 12 is provided with an upstanding pin 15 having a manipulating ring 15' in its upper end and nuts on the upper and lower side of the frame 12 so as to adjustably engage the threaded shank of the pin whereby it may be raised or lowered. A similar pin 16 is removably connected to one side of the frame, and each of these pins is provided with dished washers 17, which lie on top of the draft member 18. This draft member is provided with a plurality of apertures 19 which may be engaged by the pins so as to adjust the same upon the harrow frame.

Projecting upwardly from the forward end of the draft member 18 is a stub shaft 20, which is removably secured to the frame, and which has its upper end threaded to receive a nut whereby the draft clip or clevis 21 may be removably swiveled thereupon. Pivoted in the bifurcated end of the clip is the draft bar D. This draft bar comprises an L-shaped member 22, which has its lower inner end pivoted to the clip and its outer end bent at right angles to form an engaging tongue 23, which is apertured to receive the adjusting link 24. The outer end of this adjusting link is formed into an eye 25, which is engaged by a similar eye 26, on the draft arm 27. This draft arm is provided at its opposite end with an inclined right angularly bent portion 28, which engages one side of the frame and is secured thereto by a clamping plate 29 and bolts 30. Secured adjustably to the draft member 18 is a peculiarly shaped spacing member 31, which has projecting from its body at both ends the oppositely extending and depending arms 32 and 33. The former is provided with an off set foot which is adjustably bolted to the draft member 18, and the latter is provided with an aperture which is engaged by the eye 34 of a clamp 35 adapted to engage the rear axle 4 of the plow in the manner shown. It will be seen without further description that the frame 10 may be reversed so that the harrow teeth will have a different cut into the ground and that a number of adjustments may be made so as to accomplish the best results with the type of plow being used.

In Figs. 5 and 6 it will be seen that a suitable yoke-shaped clamp 36, surrounds the spacing member 31 and is connected thereto by an eye 37 the clamping member 38, which surrounds one of the handles 39, of the usual walking plow. In this instance the draft bar D is secured in a similar manner to that described for Figs. 1, 2, 3 and 4, to the plow beam.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim and desire to secure by Letters Patent is:—

A plow attachment comprising a circular harrow frame, a bridge piece secured thereto, a center pivot pin projecting upwardly therefrom, a pin adjustably connected to the frame, a draft member adjustably connected to said pins, an adjustable connecting device, adjustable means pivotally connecting said device to the frame, adjustable means pivotally connecting said device to the plow, a spacing member adjustably flexibly connected to the draft member for spacing the frame from the plow and means for pivotally connecting the spacing member to the plow.

In testimony whereof I have hereunto set my hand in presence of two subscribing witnesses.

CHRISTIAN CHRISTIANSON.

Witnesses:
L. F. CLAUSEN,
DICK WILLIAMS.